(No Model.) 2 Sheets—Sheet 1.

J. H. ROBERTSON.
FIBROUS CARBON BATTERY.

No. 459,447. Patented Sept. 15, 1891.

Witnesses:
Geo H Botts
M. E. Rogers

Inventor:
J. Heart Robertson
by Wm C Behrend
atty (No Model.) 2 Sheets—Sheet 2.
J. H. ROBERTSON.
FIBROUS CARBON BATTERY.
No. 459,447. Patented Sept. 15, 1891.
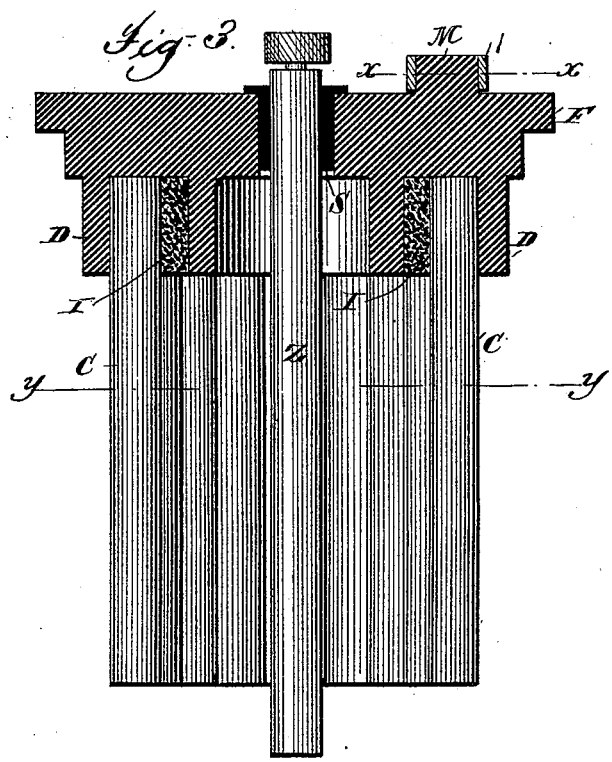
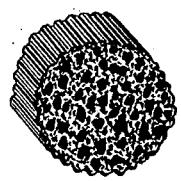
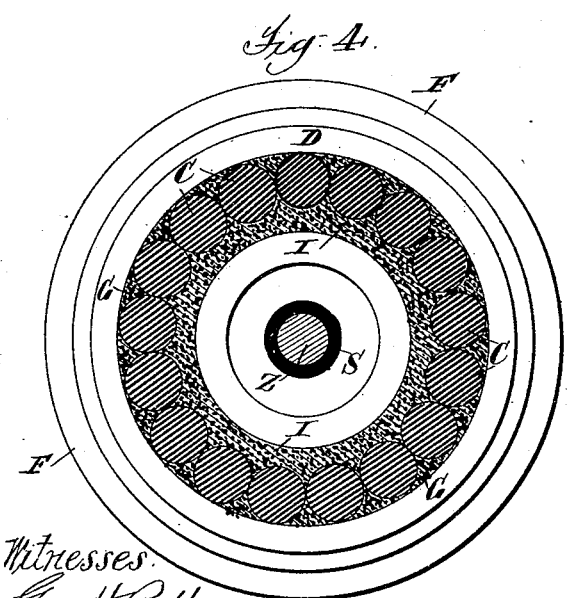
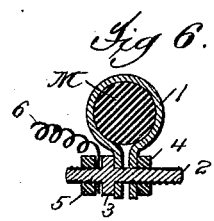
Witnesses.
Geo H Botts
M. E. Rogers
Inventor:
J. Hart Robertson
by Wm C Behrens
Atty.

UNITED STATES PATENT OFFICE.

JAMES HART ROBERTSON, OF RUTHERFORD, NEW JERSEY, ASSIGNOR OF TWO-THIRDS TO CHARLES G. TAYLOR, OF MONTCLAIR, NEW JERSEY, AND JOHN B. CAMPBELL, OF BROOKLYN, AND ROSCOE H. THOMPSON, OF NEW YORK, N. Y.

FIBROUS-CARBON BATTERY.

SPECIFICATION forming part of Letters Patent No. 459,447, dated September 15, 1891.

Application filed November 17, 1890. Serial No. 371,703. (No model.)

*To all whom it may concern:*

Be it known that I, JAMES HART ROBERTSON, a citizen of the United States, and a resident of Rutherford, Bergen county, New Jersey, have invented a new and useful Improvement in Fibrous-Carbon Batteries, of which the following is a specification.

My invention relates to batteries; and the object of my invention is, first, to produce a battery at a less cost for a given capacity than has hitherto been possible, and, second, to have it less subject to polarization than other batteries in which a single exciting material is used. I accomplish this object by the means hereinafter described, and pointed out in the claims.

Figure 1:
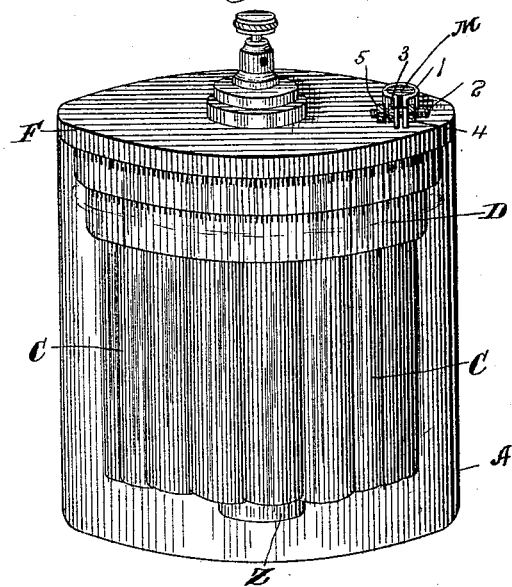
Figure 2:
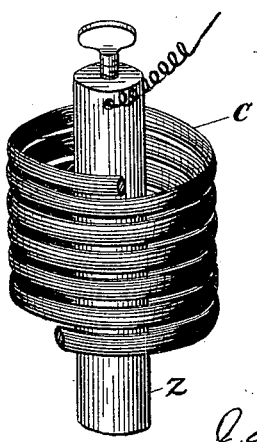

In the accompanying drawings, forming part of this specification, Figure 1 represents one form of battery embodying my invention; Fig. 2, another form; Fig. 3, a vertical cross-section of Fig. 1; Fig. 4, a view of the under side of Fig. 3, taken at $y$ $y$, Fig. 3, illustrating mode of attachment of carbon rods to top plate; Fig. 5, a magnified cross-section of the fibrous-carbon element of my battery. Fig. 6 shows mode of clamping wire to binding-post, taken on line $x$ $x$, Fig. 3.

Referring to the drawings, A represents an ordinary jar, which may be of any suitable material, and Z the zinc or positive element of the battery. For the negative element I use a carbonized fibrous material C, preferably rattan, which I prefer to use in the form of rods, but may use in the shape of a long spiral as is illustrated in Fig. 2 of the drawings.

The cover D or top piece of the battery I construct of granular carbon and provide it with a flange F to rest on the jar and with a circular groove G on its under side to hold the carbon rods. In this groove, made somewhat wider than the diameter of the carbon rods, I secure the latter in the following manner: I place the rods therein and then fill or pack the space intervening between the rods themselves and between the rods and the sides of the groove with a cement I, consisting of about seventy-five parts of powdered coke, twenty parts of lamp-black and five parts of asphaltum, after which I recarbonize the whole, thus securing a very close electrical union between the fibrous-carbon rods and the granular-carbon top piece. On the latter I form a projection M, serving as a binding-post, to which the wire may be clamped by means of band 1, screw-stem 2, having a central head or nut 3, and provided with nut 4 for tightening band on post and nut 5 for securing wire 6 between it and central head, as shown. The cover D is further provided with an opening bushed with an insulating-sleeve S, through which the zinc rod Z passes, as shown. The irregularly-corrugated outside surface of the fibrous carbon used, together with the ducts running through the lengths of the same, and which at different places connect with each other and with the outside surface, prevents to a great extent the formation of nitrogen on the the carbon. The fibrous carbon, it is believed, acts in a sort of mechanical way to largely prevent or minimize polarization, doing what is done in the Le Clanche cell by a special depolarizing substance, such as manganese, only to a much greater degree.

Any exciting material may be used that will produce the necessary chemical action. The fibrous carbon can be used in other than single fluid-batteries, and also in what are called "dry batteries."

Having thus described my invention, what I claim, and desire to secure by United States Letters Patent, is—

1. A primary battery the negative element of which consists of fibrous carbon made from rattan, substantially as described.

2. In a primary battery, the negative element consisting of fibrous carbon connected to the line through a granular-carbon conductor, substantially as described.

3. In a primary battery, the combination, with a granular-carbon top plate, of fibrous-carbon rods in intimate electrical union therewith, substantially as described.

4. In a primary battery, the combination, with a granular-carbon top plate provided with a groove, of fibrous-carbon rods held in said groove in intimate electrical contact with said top plate, substantially as described.

In testimony that I claim the foregoing as my invention I have signed my name, in presence of two witnesses, this 8th day of November, 1890.

JAMES HART ROBERTSON.

Witnesses:
 JAMES F. DOYLE,
 WALLACE WILLIAMS.